United States Patent [19]
Smith, Jr. et al.

[11] 3,719,236
[45] March 6, 1973

[54] PLURALLY ENERGIZED POWER TONGS

[75] Inventors: Roger Smith, Jr.; John Wirt Turner, Jr., both of Houston, Tex.

[73] Assignee: Byron Jackson, Inc., Long Beach, Calif.

[22] Filed: June 21, 1971

[21] Appl. No.: 155,163

[52] U.S. Cl. .................. 173/12, 81/57.14, 81/57.22, 173/163
[51] Int. Cl. .............................................. E21b 19/16
[58] Field of Search ..................... 81/57.11–57.14, 81/57.22; 173/12, 163; 91/59; 175/85; 166/77.5

[56] References Cited

UNITED STATES PATENTS

| | | | |
|---|---|---|---|
| 3,330,164 | 7/1967 | Wilson | 173/163 X |
| 3,437,158 | 4/1969 | Proffer | 173/163 |
| 3,625,095 | 3/1970 | Barnett et al. | 81/57.22 |

*Primary Examiner*—Ernest R. Purser
*Attorney*—Donald W. Banner et al.

[57] ABSTRACT

A power tong combination having a tong head adapted to be driven in opposite pipe gripping and turning directions including a pair of reversible fluid motors respectively equipped with overrunning clutches which drive the gripping mechanism (a) at a low speed and low torque to start a threaded pipe connection without danger of cross-threading; (b) at high speed to spin the threaded pipe connection together or apart, and (c) at a high torque to make up or break out the pipe connection, the combination including a hydraulic power and control system with appropriate control valve means.

25 Claims, 3 Drawing Figures

PATENTED MAR 6 1973

INVENTORS.
ROGER SMITH, JR.
JOHN W. TURNER, JR.
BY John O. Evans, Jr.
James W. Pepper

PLURALLY ENERGIZED POWER TONGS

BACKGROUND OF THE INVENTION

Field of the Invention

The present invention generally relates to power tongs, or wrenches, of the type generally employed for the purpose of making up or breaking out joints in well pipe or tubing strings or strings of sucker rods, all herein generically called pipe, as the string is run into or retrieved from a well, such as an oil or gas well. Specifically, the present invention is directed to improvements in power tongs of the kind disclosed in U.S. Pat. No. 3,481,229.

Summary of the Invention

Accordingly, among the objects of the present invention is the provision of a tong assembly having pipe gripping means adapted to grip and rotate a pipe or coupling in either direction, and power transmission means adapted to drive the pipe gripping means in opposite directions and to perform different functions during the connection and disconnection of a string of pipe.

Another object is to provide a tong assembly having means for gripping a pipe and means for applying power to the gripping means to rotate the latter at relatively low speed with low torque, relatively high speed with low torque and relatively low speed with high torque.

Still another object of the invention is the provision of a tong assembly including pipe gripping means revolvable in opposite directions, and power means for rotating the pipe gripping means at low speed with low torque or at high speed with low torque and at low speed with high torque, at the option of the operator, thus facilitating the thread starting, making up or breaking out of the pipe couplings or joints as the pipe is being connected and run into a well and subsequently disconnected and removed therefrom.

A still further object is to provide a power tong assembly and power means therefor in accordance with the foregoing, wherein a plurality of motors is included in the power transmission means for driving the pipe gripping means at low speed and low torque with one motor, at high speed and low torque with one motor and at lower speed and higher torque with more than one motor.

The above and other objects and advantages are provided in a power tong combination having rotatable pipe gripping means, a first hydraulic motor capable of high speed with means connected to rotate said pipe gripping means in either direction, a second hydraulic motor capable of high torque with means connected to rotate said pipe gripping means in either direction, fluid valving means connected to said first motor and said second motor and adapted for connection to a source of hydraulic fluid under pressure, said valving means comprising: a first control valve means connected for conducting hydraulic fluid to drive said first motor in either direction, hydraulic limit means cooperating with said first control valve to limit the flow rate and pressure of hydraulic fluid conducted to rotate said first motor in one direction and thereby limit the rotational speed and torque of said first motor; a second control valve means connected to direct hydraulic fluid to drive said second motor in either direction, and a third control valve means connected for conducting hydraulic fluid to concurrently rotate said first motor and said second motor in the same direction to impart greatest torque to said pipe gripping means, said third valve means being operable to the exclusion of said limit means and said first and said second valve means.

DESCRIPTION OF THE PREFERRED EMBODIMENTS

Figure 1:
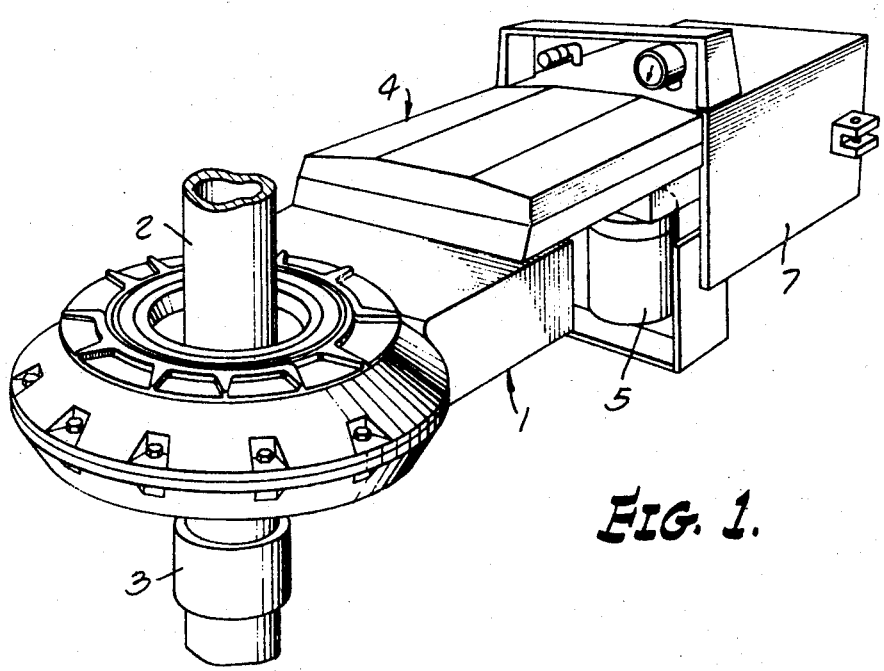
FIG. 1 is a perspective view of a power tong embodying the present invention.
Figure 2:
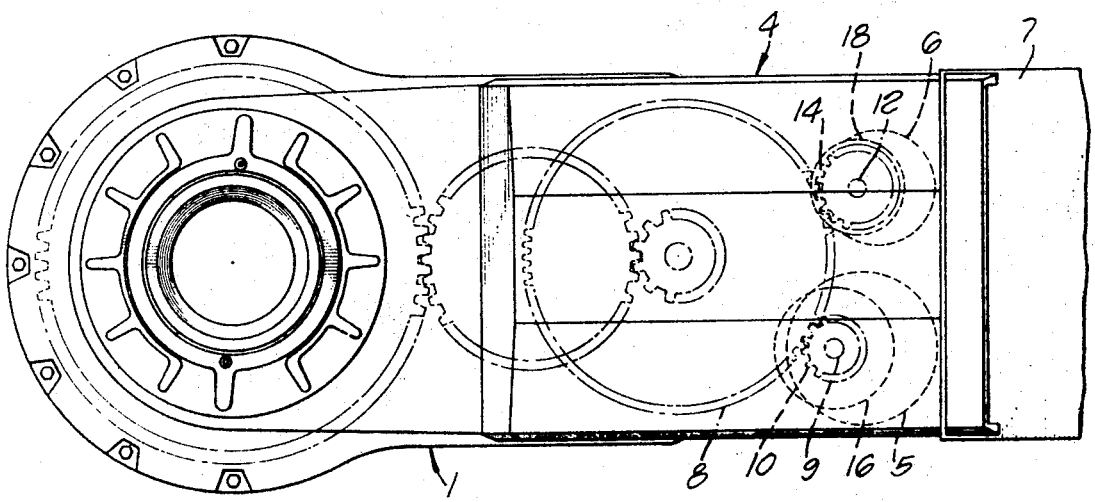
FIG. 2 is a fragmentary plan view of the structure of FIG. 1, showing the tong head and power transmission subassemblies.

Referring first to FIGS. 1 and 2, a tong assembly embodying the invention will be seen to comprise three subassemblies comprising a pipe gripping or tong head assembly 1 adapted to grip a joint and rotate the same relative to another joint, which joints together compose a threaded connection or joint between stands of well tubing or pipe or sucker rods, all of which are generically referred to herein as pipe, an illustrative length of which is generally illustrated at 2 and includes a joint or coupling 3.

Also included in the tong assembly is a power transmission subassembly generally denoted at 4 which contains drive means for effecting rotation of the pipe gripping mechanism included in the tong head. Included in the power transmission subassembly is a plurality of motors, designated 5 and 6 in the illustrative embodiment. These motors, as will hereinafter be more fully described, are adapted to drive the transmission mechanism at a relatively low speed and low torque, at a relatively high speed and low torque, and at a relatively low speed and high torque.

Further, the composite assembly includes a control subassembly generally denoted at 7 whereby an operator of the tong, in the making up and breaking out of pipe or rod joints, will be enabled to cause the motor 6 to operate in either selected direction, while motor 5 remains idle, so as to drive the pipe gripping mechanism at a relatively high rate of speed but at low torque, such as would be desirable when a joint is being initially made up and offers little resistance, such relatively high speed initial making up of the joint being generally referred to in the art as "spinning". Thereafter it is desired that the joint be finally made up by the application of relatively high torque forces which the tong operator may accomplish by causing, through the manipulation of the control mechanism 7, the simultaneous operation of motors 5 and 6 in such a manner that the transmission mechanism will impart to the gripping mechanism high torque at low speed, so as to shoulder or finally tighten up the joint.

Alternatively, in the breaking out of a joint the gripping mechanism must impose high torque on the joint in order to initiate its rotation so that the control mechanism 7 is adapted to enable the reverse rotation of both of the motors 5 and 6 in such a manner as to cause high torque low speed rotation of the pipe gripping mechanism to initially break out the joint. Thereafter, the control mechanism may be manipulated to allow the motor 5 to idle as the motor 6 continues to drive the pipe gripping mechanism at a relatively high speed under the reduced torque requirements for spinning the joint out.

The motors 5 and 6 are adapted to drive a drive ring 8 through mounting beneath a portion of the transmission case which extends to the rear of the head case. The motors 5 and 6 are preferably of the reversible hydraulic fluid type. Motors 5 and 6 are respectively equipped with output shafts 9 and 12 which are connected through double-acting, self-energizing, overunning clutch means 16 and 18 to drive pinions 10 and 14 which are engaged with gear ring 8 within the transmission case.

Motors 5 and 6 may individually or jointly drive the gear ring 8. Clutches 16 and 18 are energized to transmit torque between the output shafts 9 and 12 and pinions 10 and 14, respectively, only at such time as hydraulic fluid is supplied to drive the respective motors 5 and 6. Thus, if the motor connected to either clutch is not operating, the clutch is de-energized and the respective pinion idles along with gear ring 8. When either or both motors are operated the clutches are engaged and each motor when operated will be effective to drive the ring gear in either direction. More detailed description of a power tong structure as shown in FIGS. 1 and 2 is taught in U.S. Pat. No. 3,481,229, specifically incorporated herein by reference.

In the desirable sequence of functions employed to make up successive joints of pipe 2 into a continuous pipe string, each joint of pipe 2 is positioned in axial alignment into a box or collar 3 and slowly and carefully rotated to permit the complementary threads to properly register and start into threaded connection. If the connection does not start properly and appears to be becoming cross threaded, then the rotation of pipe 2 is reversed until the threads are separated and again rotated slowly to start the threads into connection. If the threads are being started by means such as the power tongs disclosed herein, the tongs must be rotated at low speed and very low torque in order to facilitate registry of the threads during starting and also in order to stop rotation should the rotational torque increase appreciably in the event of cross threading and consequent damage to the threads.

At such time as the threads are started the pipe may be rotated rapidly to spin the threads into initial connection. At such time as the threaded connection has been initially made it is then finally made up by application of substantially high torque applied at a low rotational speed.

As each joint of pipe 2 is subsequently disconnected from a collar 3 during removal of the pipe string, high torque is first applied at low speed to break out the threaded connection followed by application of substantially less torque at high speed to spin the loosened threads to free the pipe from the collar.

Figure 3:
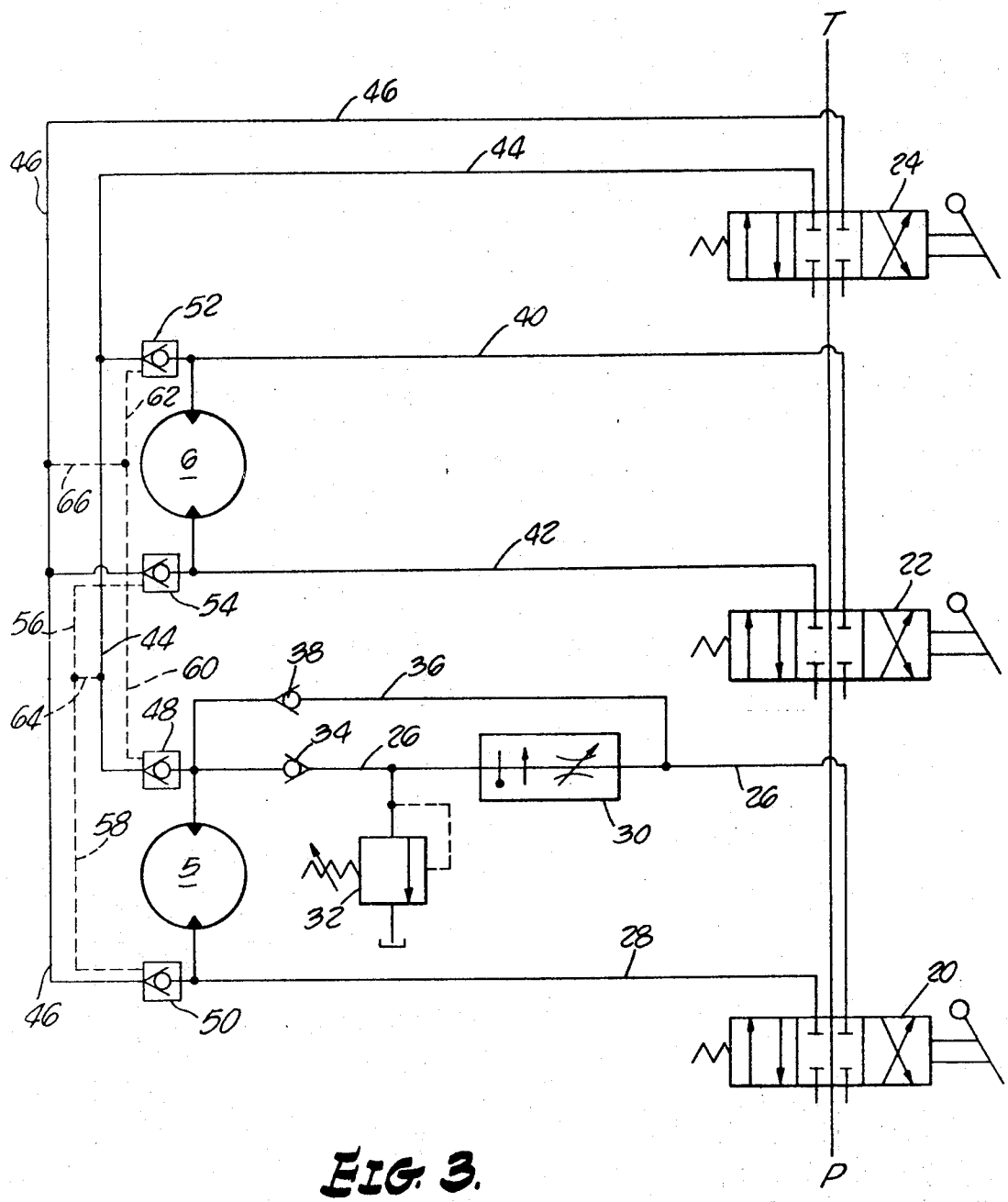
FIG. 3 is a graphic illustration of a hydraulic control system of the present invention wherein the hydraulic symbols conform to American Standards Association ASA Y 32.10.

The foregoing functions are provided for the power tong through provision of the system shown in FIG. 3. Directional control valves 20, 22 and 24 are shown as conventional four-way three-position spool type valves having work ports blocked to flow when the spool is in neutral position. Valves 20, 22 and 24 may be parallel connected to a source of hydraulic fluid pressure P, as shown, and to a return fluid reservoir system T when all valves are centered as graphically illustrated. As shown in the drawing, the pressure source P would be regulated by a high pressure relief valve (not shown) as is usually the case. Otherwise a pressure relief may be desirably provided in line 26 between valve 20 and flow control valve 30 to return any excess fluid from source P to reservoir T. Valves 20, 22 and 24 are shown as being spring or otherwise biased into normally neutral position and may be suitably mounted with the control subassembly 7 if desired. These valves alternately may be remotely mounted and/or remotely operated by electrical, pneumatic or hydraulic control means as desired.

Control valve 20 is connected through a line 26 and a line 28 to the hydraulic ports of motor 5. An adjustable flow control valve 30 is incorporated into line 26 for the purpose of reducing the input volume rate of the hydraulic power fluid to motor 5 in one direction of rotation to cause motor 5 to rotate the tong very slowly for the purpose of starting the thread of pipe 2 into collar 3.

An adjustable fluid pressure relief valve 32 is also incorporated into line 26 between the outlet of flow control valve 30 and motor 5 which may be adjusted to reduce the input pressure to motor 5 to a value reducing the torque which motor 5 can develop and thereby permit the tong to stall before any threads are damaged should the threads begin to cross thread.

Incorporated in line 26 between motor 5 and pressure relief valve 32 is a check valve 34 which serves to prevent high pressure fluid from backing into line 26 and undesirably leaking through relief valve 32, as later evident.

A fluid bypass line 36 incorporating a check valve 38 is connected in shunt across valves 30, 32 and 34 to permit rapid return fluid flow from motor 5 and consequent rapid reverse rotation of the motor upon appropriate positioning of control valve 20.

Directional control valve 22 is connected to the hydraulic ports of motor 6 through lines 40 and 42. Flow through motor 6 is blocked when valve 22 is in neutral position and directed to flow into line 40 or line 42 responsive to the position of the valve to drive motor 6 at high speed in either direction to spin the pipe 2 during the connection or disconnection of the pipe threads.

Valve 24 is connected to the hydraulic ports of both motors 5 and 6 through lines 44 and 46. Valve 24 when in neutral position, is blocked off from both motors 5 and 6 and does not affect discrete operation of motor 5 through control valve 20 or such operation of motor 6 through valve 22. When control valve 24 is shifted to either directional position, fluid pressure from power source P serves to rotate both of motors 5 and 6 in the same desired direction with accumulative torque development from both motors for driving the tong head 1 to make up a finally tight connection of the pipe or to break out an initially tight connection. Valves 20 and 22 are in neutral position blocking off lines 26, 28, 40 and 42.

Pilot pressure operated check valves 48 and 52, which are normally closed and opened with pilot pressure, are connected into line 44 between control valve 24 and motors 5 and 6. Pilot pressure is provided to check valves 48 and 52 from line 46 through control lines 60, 62 and 66 connected as shown. Pilot operated check valves 50 and 54, also normally closed and opened with pilot pressure, are connected into line 46 between control valve 24 and motors 5 and 6. Pilot pressure to check valves 50 and 54 is provided from line 44 through lines 56, 58 and 64 connected as shown.

As connected, motor 6 is isolated from the fluid flow actuating motor 5 through lines 26 and 28 from valve 20 by check valves 48 and 50. Motor 5 is isolated from the fluid flow actuating motor 6 through lines 40 and 42 from valve 22 by check valves 52 and 54. Thus motor 5 is isolated from motor 6 when actuated by valve 20 and motor 6 is likewise isolated from motor 5 when actuated by valve 22.

When valve 24 is actuated to operate both motors 5 and 6, flow through line 44 is directed to motors 5 and 6 through check valves 48 and 52. Pilot pressure from line 44 opens check valves 50 and 54 to permit return flow of fluid from the motors through line 46. Thus high torque at low speed is provided for final make up.

For initial break out of a joint, the process is reversed. Flow through line 46 passes through check valves 50 and 54 to motors 5 and 6. Pilot pressure from line 46 opens check valves 48 and 52 to permit return flow from the motors.

As seen, the check valves mounted generally on one side of the motors are pilot operated from the lines on the opposite sides of the motors. The valves are so arranged and the pilot lines so connected that motor 6 is isolated from valve 20, motor 5 is isolated from valve 22, and the pilot lines are isolated from both valves 20 and 22. Thus, the valve 20 directs flow to motor 5, valve 22 directs flow to motor 6, and valve 24 directs flow to motors 5 and 6.

The following is a description of the operation of the disclosed system:

Directional control valve 20 is actuated to direct flow to motor 5. Flow control valve 30 has been adjusted to provide very slow rotation of motor 5. Relief valve 32 has been adjusted to reduce the torque developed by motor 5 and thereby prevent damage to the pipe thread in the event that the threads are not aligned and try to cross. The fluid directed to motor 5, upon actuation of valve 20, causes the motor to rotate which in turn energizes the clutch on motor 5 to produce tong rotation. Rotation of the tong head closes the jaws on the pipe to provide relative rotation of the two halves of the connection. Should cross threading occur as the joint starts to make up, the tong will stall, in which case the operator may reverse the tong and align the joint to prevent a cross thread.

After the tong has rotated the joint for one or two threads or a sufficient amount to assure that cross threading will not occur, directional control valve 20 is returned to its neutral position and directional control valve 22 is actuated. Full input volume is directed to motor 6. The double overrunning clutch engages the motor 5 to high tong speed to spin the pipe into connection. Since no fluid power is supplied to motor 5, it is disengaged during spin up.

When the joint is fully spun up, the operator returns directional valve 22 to neutral and actuates directional valve 24. Fluid power is supplied to both motors. The double overrunning clutches engage both motors for high torque final make up.

To use the tong for breaking out joints, directional control valve 24 is actuated in its reverse position, engaging both motors to provide high torque for breaking the joint. Valve 24 is then returned to neutral and directional control valve 20 or 22 is actuated in its reverse position for spin out. Should valve 20 be actuated, return flow from the motor is through check valve 38 which is in line 36 shunting flow control valve 30 and check valve 34.

It is to be understood that the circuit shown may be modified somewhat without losing the desired features. For example, if motor 5 is larger than motor 6, and the speed of motor 5 under full system flow is sufficiently slow to assist in preventing a cross thread, then flow control valve 30 may be omitted from the circuit. If it is further desirable to provide a simplified circuit which will not permit motor 5 to operate in reverse when directional control valve 20 is actuated, the shunt circuit containing check valve 38 may be omitted.

It is to be noted that the separate motors 5 and 6 are each respectively equipped with the double-acting, self-energized, overrunning clutch means 16 and 17 to individually and jointly drive gear ring 80 when hydraulic fluid is appropriately supplied to activate and drive the motors. The motors and overrunning clutches are further seen to be adapted for operation with the hydraulic control circuit as herein disclosed to provide the combined pipe thread starting, thread spinning, and thread make up functions heretofore not attained by the prior art.

The foregoing description and drawing will suggest other embodiments to those skilled in the art, all of which are intended to be included in the spirit of the invention as set forth herein.

That being claimed is:

1. In a power tong combination having rotatable pipe gripping means, a first high speed hydraulic motor with means connected to rotate said pipe gripping means in either direction, a second high torque hydraulic motor with means connected to rotate said pipe gripping means in either direction, fluid valving means connected to said first motor and said second motor and adapted for connection to a source of hydraulic fluid under pressure, said valving means comprising: a first control valve means connected for conducting hydraulic fluid to drive said first motor in either direction, hydraulic limit means cooperating with said first control valve means to limit the flow rate and pressure of hydraulic fluid conducted to rotate said first motor in one direction and thereby limit the rotational speed and torque of said first motor, a second control valve means connected to direct hydraulic fluid to drive said second motor in either direction and a third control valve means connected for conducting hydraulic fluid to concurrently rotate said first motor and said second motor in the same direction to impart greatest torque to said pipe gripping means said third valve means being operable independently of said limit means and said first and said second valve means.

2. A power tong as defined in claim 1 wherein said hydraulic limit means includes a flow control valve connected to limit flow of hydraulic fluid to said first motor and a pressure relief valve connected to limit the pressure of hydraulic fluid to said first motor.

3. A power tong as defined in claim 1 wherein each of said control valve means comprises a valve having two positions for providing opposing flow direction and a neutral position wherein the working flow ports of said valve are closed off.

4. A power tong as defined in claim 1 wherein said hydraulic limit means comprises a fluid flow restriction means in cooperative connection with a fluid pressure limiting means.

5. A power tong comprising: rotatable pipe gripping mean, a first hydraulic motor with means connected to rotate said pipe gripping means in either direction, a second hydraulic motor with means connected to rotate said pipe gripping means in either direction, hydraulic control means connected to said first motor and said second motor and adapted for connection to a source of hydraulic fluid under pressure and including a first control valve means connected for conducting hydraulic fluid to drive said first motor in either direction, hydraulic limit means cooperating with said first control valve means to limit the flow rate and pressure of hydraulic fluid conducted to rotate said first motor in one direction and thereby limit the rotational speed and torque of said first motor, a second control valve means connected to direct hydraulic fluid to drive said second motor in either direction, and a third control valve means connected for conducting hydraulic fluid to concurrently rotate said first motor and said second motor in the same direction to impart greatest torque to said pipe gripping means, said third valve means being operable independently of said limit means and said first and said second valve means.

6. A power tong as defined in claim 5 wherein said hydraulic limit means includes a flow control valve connected to limit flow of hydraulic fluid to said first motor and a pressure relief valve connected to limit the pressure of hydraulic fluid to said first motor.

7. A power tong as defined in claim 5 wherein each of said control valve means comprises a valve having two positions for providing opposing flow direction and a neutral position wherein the working flow ports of said valve are closed off.

8. A power tong as defined in claim 5 wherein said hydraulic limit means comprises a fluid flow restriction means in cooperative connection with a fluid pressure limiting means.

9. A power tong as defined in claim 7 wherein said hydraulic limit means includes a flow control valve connected to limit flow of hydraulic fluid to said first motor and a pressure relief valve connected to limit the pressure of hydraulic fluid to said first motor.

10. A power tong as defined in claim 9 wherein each of said control valve means comprises a valve having two positions for providing opposing flow direction and a neutral position wherein the working flow ports of said valve are closed off.

11. A power tong as defined in claim 7 wherein said hydraulic limit means comprises a fluid flow restriction means in cooperative connection with a fluid pressure limiting means.

12. A power tong comprising: rotatable pipe gripping means, a first hydraulic motor with means connected to rotate said pipe gripping means in either direction, a second hydraulic motor with means connected to rotate said pipe gripping means in either direction, hydraulic control means connected to said first motor and said second motor and adapted for connection to a source of hydraulic fluid under pressure and including a first control valve means connected for conducting hydraulic fluid to drive said first motor in either direction, hydraulic limit means cooperating with said first control valve means to limit the flow rate and pressure of hydraulic fluid conducted to rotate said first motor in one direction and thereby limit the rotational speed and torque of said first motor, a second control valve means connected to direct hydraulic fluid to drive said second motor to either direction, and a third control valve means connected for conducting hydraulic fluid to concurrently rotate said first motor and said second motor in the same direction to impart greatest torque to said pipe gripping means.

13. A power tong comprising: rotatable pipe gripping means, a first hydraulic motor with means including a first overrunning clutch means connected to rotate said pipe gripping means in either direction when activated and disconnected to idle when deactivated, a second hydraulic motor with means including a second overrunning clutch means connected to rotate said pipe gripping means in either direction when activated and disconnected to idle when deactivated, said first motor and said second motor being adapted for connection with hydraulic control means energized by a source of hydraulic fluid under pressure, said hydraulic control means including a first control valve means connected for conducting hydraulic fluid to drive said first motor in either direction, a second control valve means connected to direct hydraulic fluid to drive said second motor in either direction, and a third control valve means connected for conducting hydraulic fluid to concurrently rotate said first motor and said second motor in the same directions to impart greatest torque to said pipe gripping means.

14. A power tong comprising: rotatable pipe gripping means, a first hydraulic motor with means including a first self-energizing and overrunning clutch means connected to rotate said pipe gripping means in either direction when activated and disconnected to idle when deactivated, a second hydraulic motor with means including a second self-energizing and overrunning clutch means connected to rotate said pipe gripping means in either direction when activated and disconnected to idle when deactivated, hydraulic control means connected with said first motor and said second motor and adapted for connection to a source of hydraulic fluid under pressure, said hydraulic control means including a first control valve means connected for conducting hydraulic fluid to drive said first motor in either direction, hydraulic limit means cooperating with said first control valve means to limit the flow rate and pressure of hydraulic fluid conducted to rotate said first motor in one direction and thereby limit the rotational speed and torque of said first motor, a second control valve means connected to direct hydraulic fluid to drive said second motor in either direction, and a third control valve means connected for conducting hydraulic fluid to concurrently rotate said first motor and said second motor in the same directions to impart greatest torque to said pipe gripping means.

15. A power tong comprising: rotatable pipe gripping means, a first hydraulic motor with means including a first self-energizing and overrunning clutch means connected to rotate said pipe gripping means in either direction when activated and disconnected to idle when deactivated, a second hydraulic motor with means including a second self-energizing and overrunning clutch means connected to rotate said pipe gripping means in either direction when activated and disconnected to idle when deactivated, hydraulic control means connected with said first motor and said second motor and adapted for connection to a source of hydraulic fluid under pressure, said hydraulic control means including a first control valve means connected for conducting hydraulic fluid to drive said first motor in either direction, hydraulic limit means cooperating with said first control valve means to limit the flow rate and pressure of hydraulic fluid conducted to rotate said first motor in one direction and thereby limit the rotational speed and torque of said first motor, and a second control valve means connected to direct hydraulic fluid to drive said second motor in either direction.

16. A power tong comprising: rotatable pipe gripping means, a first motor with means including a first self-energizing and overrunning clutch means connected to rotate said pipe gripping means in either direction when activated and disconnected to idle when deactivated, a second motor with means including a second self-energizing and overrunning clutch means connected to rotate said pipe gripping means in either direction when activated and disconnected to idle when deactivated, control means connected with said first motor and said second motor, said control means including a first control means connected to drive said first motor in either direction, limit means cooperating with said first control means to limit the rotational speed and torque of said first motor, and a second control valve means connected to drive said second motor in either direction.

17. A power tong comprising: rotatable pipe gripping means, a first motor with means including a first self-energizing and overrunning clutch means connected to rotate said pipe gripping means in either direction when activated and disconnected to idle when deactivated, a second motor with means including a second self-energizing and overrunning clutch means connected to rotate said pipe gripping means in either direction when activated and disconnected to idle when deactivated, control means connected with said first motor and said second motor, said control means including a first control means connected to drive said first motor in either direction, a second control means connected to drive said second motor in either direction, and a third control means connected to concurrently rotate said first motor and said second motor in the same directions to impart greatest torque to said pipe gripping means.

18. A power tong comprising: rotatable pipe gripping means, a first hydraulic motor with means including a first self-energizing and overrunning clutch means connected to rotate said pipe gripping means in either direction when activated and disconnected to idle when deactivated, a second hydraulic motor with means including a second self-energizing and overrunning clutch means connected to rotate said pipe gripping means in either direction when activated and disconnected to idle when deactivated, hydraulic control means connected with said first motor and said second motor and adapted for connection to a source of hydraulic fluid under pressure, said hydraulic control means including a first control valve means connected for conducting hydraulic fluid to drive said first motor in either direction, and a second control valve means connected to direct hydraulic fluid to drive said second motor in either direction.

19. A power tong as defined in claim 18 including hydraulic limit means cooperating with said first control valve means to limit the flow rate and pressure of hydraulic fluid conducted to rotate said first motor and thereby limit the rotational speed and torque of said first motor.

20. A power tong as defined in claim 18 including a third control valve means connected for conducting hydraulic fluid to concurrently rotate said first motor and said second motor together to impart greatest torque to said pipe gripping means.

21. A power tong as defined in claim 18 wherein each of said control valve means comprises a valve having two positions for providing opposing flow direction and a neutral position wherein the working flow ports of said valve are closed off.

22. A power tong as defined in claim 19 wherein said hydraulic limit means comprises a fluid flow restriction means in cooperative connection with a fluid pressure limiting means.

23. A power tong as defined in claim 19 wherein said hydraulic limit means includes a flow control valve connected to limit flow of hydraulic fluid to said first motor and a pressure relief valve connected to limit the pressure of hydraulic fluid to said first motor.

24. A power tong as defined in claim 22 wherein each of said control valve means comprises a valve having two positions for providing opposing flow direction and a neutral position wherein the working flow ports of said valve are closed off.

25. A power tong as defined in claim 22 including a third control valve means connected for conducting hydraulic fluid to concurrently rotate said first motor and said second motor together to impart greatest torque to said pipe gripping means.

* * * * *

UNITED STATES PATENT OFFICE
CERTIFICATE OF CORRECTION

Patent No. 3,719,236       Dated March 6, 1973

Inventor(s) Roger Smith, Jr., et al.

It is certified that error appears in the above-identified patent and that said Letters Patent are hereby corrected as shown below:

Column 5, line 66 change "motor 5" to -- motor 6 --.

Signed and sealed this 8th day of January 1974.

(SEAL)
Attest:

EDWARD M. FLETCHER, JR.
Attesting Officer

RENE D. TEGTMEYER
Acting Commissioner of Patents